(12) United States Patent
Hoctor et al.

(10) Patent No.: US 8,080,800 B2
(45) Date of Patent: Dec. 20, 2011

(54) METHOD AND APPARATUS FOR IMAGE RECONSTRUCTION FOR A SYNTHETIC APERTURE GAMMA RAY IMAGER

(75) Inventors: Ralph Thomas Hoctor, Saratoga Springs, NY (US); Scott Stephen Zelakiewicz, Niskayuna, NY (US); Evren Asma, Niskayuna, NY (US)

(73) Assignee: Morpho Detection, Inc., Newark, CA (US)

( * ) Notice: Subject to any disclaimer, the term of this patent is extended or adjusted under 35 U.S.C. 154(b) by 782 days.

(21) Appl. No.: 12/332,439

(22) Filed: Dec. 11, 2008

(65) Prior Publication Data

US 2009/0297058 A1    Dec. 3, 2009

Related U.S. Application Data

(60) Provisional application No. 61/057,579, filed on May 30, 2008.

(51) Int. Cl.
   *G06K 9/40* (2006.01)
   *G01T 1/164* (2006.01)
(52) U.S. Cl. ............... 250/363.02; 250/363.03; 382/128
(58) Field of Classification Search ............ 250/363.02, 250/363.03; 382/274, 128
   See application file for complete search history.

(56) References Cited

U.S. PATENT DOCUMENTS

| | | | |
|---|---|---|---|
| 7,550,738 | B1 | 6/2009 | DeVito |
| 2006/0284094 | A1 | 12/2006 | Inbar |
| 2007/0040124 | A1* | 2/2007 | Accorsi ............... 250/363.06 |
| 2008/0203316 | A1* | 8/2008 | Ziock ............... 250/393 |

OTHER PUBLICATIONS

Ziock et al., "A Fieldable-Prototype, Large-Area, Gamma-Ray Imager for Orphan Source Search," IEEE Nuclear Science Symposium Conference Record, 2007, pp. 949-958.
Ziock et al., "Large Area Imaging Detector for Long-Range, Passive Detection of Fissile Material," IEEE Transactions on Nuclear Science, vol. 51, No. 5, Oct. 2004, pp. 2238-2244.
Ziock et al., "Source-Search Sensitivity of a Large-Area, Coded-Aperture, Gamma-Ray Imager," IEEE Transactions on Nuclear Science, vol. 53, No. 3, Jun. 2006, pp. 1614-1621.
Hudson et al., "Accelerated Image Reconstruction Using Ordered Subsets of Projection Data," IEEE Transactions on Medical Imaging, vol. 13, No. 4, Dec. 1994, pp. 601-609.
Shepp et al., "Maximum Likelihood Reconstruction for Emission Tomography," IEEE Transactions on Medical Imaging, vol. MI-1, No. 2, Oct. 1982, pp. 113-122.

* cited by examiner

*Primary Examiner* — Tony Ko
(74) *Attorney, Agent, or Firm* — Armstrong Teasdale LLP

(57) ABSTRACT

An imaging system includes a platform having mounted thereon an imaging device. The imaging device includes a first detector and a second detector. The imaging system includes a mask having a first pattern of apertures therein, the mask positioned on a first side of the first detector, an anti-mask having a second pattern of apertures therein, wherein the second pattern is derived from the first pattern, the anti-mask positioned on a first side of the second detector, and a computer configured to acquire a plurality of mask datasets and anti-mask datasets of a gamma source, add one of the mask datasets and subtract its respective anti-mask dataset to create a far-field dataset, adjust the far-field image dataset, reconstruct a near-field image of the source using the far-field dataset, and apply an expectation maximization (EM) algorithm to one of the far-field image dataset and the near-field image to enhance contrast.

26 Claims, 5 Drawing Sheets

METHOD AND APPARATUS FOR IMAGE RECONSTRUCTION FOR A SYNTHETIC APERTURE GAMMA RAY IMAGER

CROSS-REFERENCE TO RELATED APPLICATION

The present application is a non-provisional of, and claims priority to, U.S. Provisional Application 61/057,579 filed May 30, 2008, the disclosure of which is incorporated herein.

GOVERNMENT LICENSE RIGHTS

The U.S. Government has a paid-up license in this invention and the right in limited circumstances to require the patent owner to license others on reasonable terms as provided for by the terms of contract No. HSHQDC-07-C-00092 awarded by the U.S. Department of Homeland Security.

BACKGROUND

The invention relates generally to detecting a gamma ray point source and, more particularly, to a method and apparatus of image reconstruction for a synthetic aperture gamma ray imager.

Radioactive materials can be detected by the gamma radiation that they produce as component radioisotopes decay. This radiation is produced from a source of radioactive materials that may be used in a nuclear device or a radiological dirty bomb, as examples. Detection of gamma radiation may take place in the presence of naturally-occurring background gamma radiation, which can originate from soil or building materials, for example. When the gamma radiation from a concentration of radioactive materials is sensed close to its source, this background radiation does not present an impediment to source detection due to the high gamma photon flux emanating from the source. When the sensing apparatus is far removed from the radiation source, though, detection of the source against the background presents challenges. When the aggregate background radiation produces counts at a higher rate than the source, a non-imaging radiation detector may not be able to detect the presence of the source at all. Even if a source is close enough to the apparatus to be detected, a non-imaging radiation detector may establish only the proximity to the point at which the detector observed the largest signal and is not typically capable of pinpointing the source location.

In applications that include stand-off mode (i.e., measured at a distance), such as, for example, in a reconnaissance operation seeking the source of radioisotopes, the total number of counts detected from the source is typically much less than the number of counts detected from background. In such a case, detection of the source may be facilitated by forming an image of the source distribution. Imaging data may be acquired when the platform on which the imaging apparatus is mounted is moving, and when this is the case, the path of the platform is called the imaging baseline. The image formed in this mode is a synthetic aperture image, and the effective aperture of this image is the imaging baseline. Thus, the synthetic aperture can be very large when compared with the dimension of the actual imaging device. This means that source, which may be in the far field of the imaging apparatus, is in the near-field of the synthetic aperture.

Forming an image from data acquired over the length of the baseline serves to distribute the background measurement over a large area, making it clear that the background of the measurement does not represent a point source. An actual point source, on the other hand, is imaged and will show in the image as a point, and so the point is made detectable despite a high aggregate background.

A mode of imaging used in some systems is known as back-projection or laminography. One approach forms a near-field image from multiple far-field images, which are functions of angle only, by extending the far-field image value at each angle to all near-field pixels (or voxels) that lie at that angle. This description applies both to the extension of a one dimensional far-field image to a two dimensional (planar) near-field image and to the extension of a two dimensional near-field image to a three dimensional (volumetric) near-field image. Such a generation of near-field imagery from far-field imagery is sometimes referred to as tomographic imaging.

One field in which tomographic imaging is widely practiced is that of emission tomography. The field of emission tomography makes use of several reconstruction approaches that include statistical reconstruction techniques based on an Expectation Maximization (EM) algorithm for iteratively computing maximum likelihood estimates of parameters in so-called "hidden data" problems. The first application of this approach to low-count emission tomography was proposed by Shepp and Vardi. Later, Hudson and Larkin found that the convergence of this algorithm could be improved; their algorithm is called the Ordered Subsets Expectation Maximization (OSEM) algorithm.

One method for producing a far-field image from the basic imaging apparatus may use standard, correlation-based coded-aperture imaging that includes using a device having an aperture composed of photon-absorbing elements positioned in front of a position-sensitive detector array (such as an Anger camera). This mode of operation is advantageous in that more than a single location on the position-sensitive detector is employed to measure photons from every direction, so that a larger number of source photons are recorded than with a parallel-hole collimator, for example. An associated disadvantage is that recorded energy from a source is spread out over a large range of angles in addition to the correct one, although the incorrectly attributed energy is spread to different angles for different PSD detector locations.

While imaging has an advantage over simple radiation counting in terms of detection, certain combinations of source and background emission rates, and source distance and total observation time, can cause images of point sources in background to fail to unambiguously image a point source. Further, although imaging may favorably increase the probability of detection, there may be a corresponding increase in the probability of a false alarm occurring. Thus, when background radiation level is high and when the false alarm rate requirement is low, detection may be difficult, and the threshold may have to be set high. The higher threshold means that many images with moderate but acceptable contrast may be errantly rejected as not having a source, or "missed." Contrast enhancement using a point-wise, non-data-adaptive image transform can transform some of these misses into detections, but such algorithms also tend to create false detections when there is no source—which may cause the threshold to be set to an even higher threshold to reject them.

Additionally, known methods and apparatus for background removal involve making two separate measurements of the source distribution using two masks and subtracting them, prior to back-projection, to form a new measurement with zero-mean background. This is commonly referred to as mask/anti-mask subtraction, because of the optimal relationship between configurations of the two masks. However, such an approach may not improve the detectability of gamma sources and, when absorbing mask elements are non-opaque, source counts are lost in the subtraction and may result in a source that is less detectable.

Therefore, it would be desirable to design an apparatus and method of image reconstruction for a synthetic aperture gamma ray imager that results in a higher-contrast reconstructed image with enhanced source detectability in high levels of background radiation.

SUMMARY

Embodiments of the invention provide an apparatus and method that overcome at least one of the aforementioned drawbacks. A system and method is disclosed that includes an imaging device positioned to receive radiation from a source over an imaging baseline. The device is configured to acquire imaging data, process the data into an image, and enhance contrast of the image.

According to one aspect of the invention, an imaging system includes a platform having mounted thereon an imaging device. The imaging device includes a first detector and a second detector. The imaging system includes a mask having a first pattern of apertures therein, the mask positioned on a first side of the first detector, an anti-mask having a second pattern of apertures therein, wherein the second pattern is derived from the first pattern, the anti-mask positioned on a first side of the second detector, and a computer configured to acquire a plurality of mask datasets and anti-mask datasets of a gamma source, add one of the mask datasets and subtract its respective anti-mask dataset to create a far-field dataset, adjust the far-field image dataset, reconstruct a near-field image of the source using the far-field dataset, and apply an expectation maximization (EM) algorithm to one of the far-field image datasets and the near-field image to enhance contrast.

In accordance with another aspect of the invention, a method of imaging a gamma source includes positioning a mask/anti-mask combination between a source and a detector, acquiring mask datasets from the source over a baseline and from gamma rays emitted from the source and passing through the mask, and acquiring anti-mask datasets from the source over a baseline and from gamma rays emitted from the source and passing through the anti-mask. The method also includes adding the mask datasets and subtracting respective anti-mask datasets to obtain respective far-field datasets, offsetting at least a portion of the data within each far-field dataset, forming a near-field image of a source of the photons using the offset data, and applying an iteration of an expectation maximization (EM) reconstruction algorithm to one of the far-field datasets and the near-field image.

Yet another aspect of the invention includes a computer readable storage medium having stored thereon a program configured to acquire a plurality of sets of mask and anti-mask datasets of a radiation source from an imaging device over a synthetic aperture. The acquired sets of data include a mask dataset acquired from gamma rays passing through a mask, and an anti-mask dataset acquired from gamma rays passing through an anti-mask. The program is further configured to subtract the anti-mask dataset from the mask dataset to form a far-field image dataset, offset the far-field image dataset, reconstruct a near-field image of the source using the offset far-field image dataset, and enhance contrast of the reconstructed near-field image using an ordered subsets expectation maximization (OSEM) algorithm.

These and other advantages and features will be more readily understood from the following detailed description of preferred embodiments of the invention that is provided in connection with the accompanying drawings.

DETAILED DESCRIPTION OF EXEMPLARY EMBODIMENTS

The method and apparatus described herein are directed toward detection of a point source of gamma radiation in high levels of background radiation. While embodiments of the invention are described with respect to a method and apparatus directed toward constructing a near-field image of a gamma source, the method and apparatus described may be applicable to identifying a broad range of low-level radiation sources against a high-level background.

Figure 1:
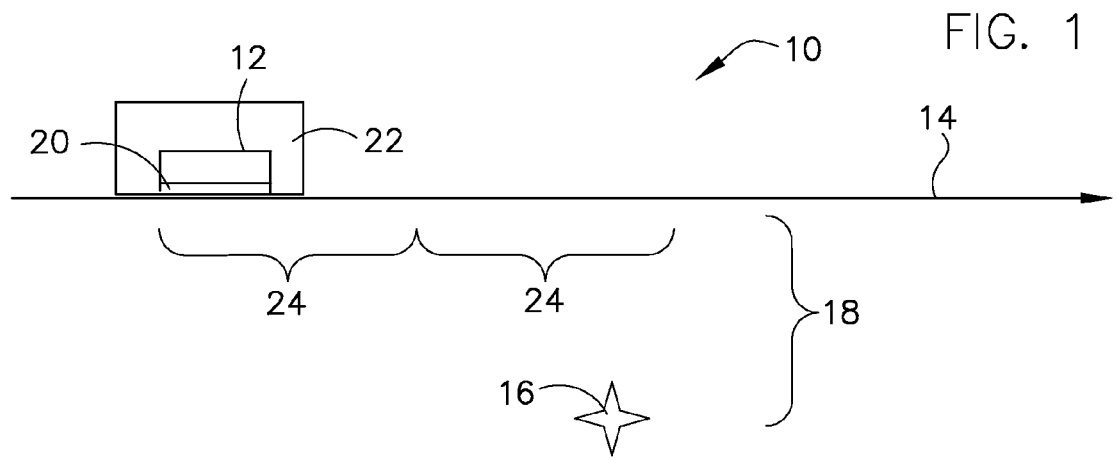
FIG. 1 illustrates an imaging scenario according to an embodiment of the invention.

FIG. 1 illustrates an imaging scenario 10 according to an embodiment of the invention. Imaging scenario 10 includes an imaging system or device (which may include an imaging aperture mask and a position-sensitive detector such as an Anger camera, as an example) 12 configured to move along a synthetic aperture or baseline 14 while acquiring far-field imaging data, datasets, or real-valued imaging data, when gamma source 16 is positioned in a far-field of imaging device 12. Gamma source 16 represents a source of radioactive materials that may be used in a nuclear device or a radiological dirty bomb, as examples. Imaging device 12 moves along a synthetic aperture or baseline 14 and passes within a distance 18 of gamma source 16. The imaging device 12, in this embodiment, includes a coded aperture or mask 20 and may be transported on a mobile platform 22 positioned on one of a truck, a sport utility vehicle (SUV), an airplane, a helicopter, and the like. In embodiments of the invention, the platform position is known or derived from global positioning satellites (GPS), inertial guidance systems, and the like.

In operation, imaging device 12 is caused to acquire far-field imaging data over a plurality of sub-apertures 24. The far-field images include a plurality of far-field images from a source, such as gamma source 16, and each far-field image includes a measured distribution of photons on a position-sensitive detector acquired along the baseline 14. Thus, in general, a plurality of far-field images are acquired with the platform positioned over N baseline segments or sub-apertures 24 along a baseline or path 14, wherein N is an integer ≧2.

Image formation occurs over a period of time during which the mobile platform 22 moves along baseline 14. The image formation approach is a synthetic aperture, near-field imaging scheme based on multiple far-field images. At a set of locations (not shown) of the mobile platform 22, far-field images or datasets of the gamma source 16 are computed using the coded aperture imaging device 12, and these images are back-projected, registered and added to produce a final near-field image. Such addition of real-valued images from sub-apertures 24 is a known approach to synthetic aperture imaging. Because the baseline 14 is so much larger than the physical aperture of imaging device 12, gamma source 16 is in the far field of the physical imaging device 12, but in the near field of a near-field image generated from the far-field images acquired over the sub-apertures 24 along baseline 14.

Figure 2:
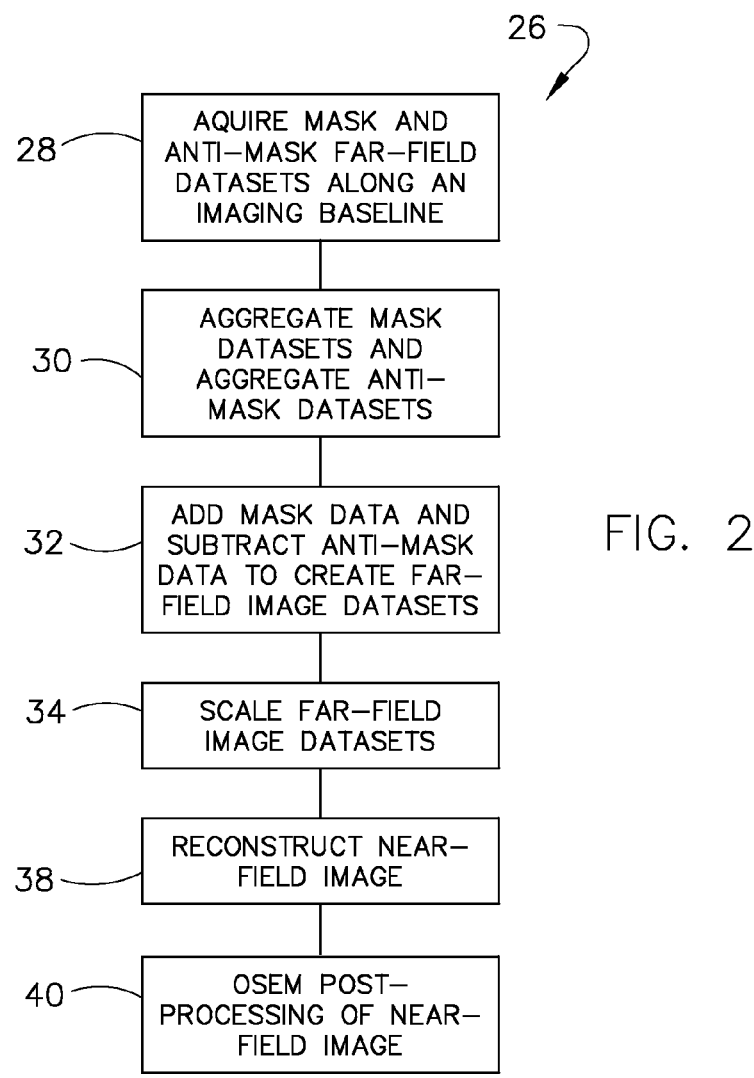
FIG. 2 illustrates a technique for data acquisition and image reconstruction according to the invention.

FIG. 2 illustrates a flowchart for mask/anti-mask data acquisition and contrast enhancement according to embodiments of the invention. FIG. 2 illustrates a process 26 that begins by acquiring mask and anti-mask far-field datasets along an imaging baseline or synthetic aperture at step 28 as described with respect to FIG. 1. Process 26 includes aggregating mask and anti-mask at step 30 and forming far-field imaging datasets at step 32 by adding mask data and subtracting anti-mask data. The far-field image datasets are scaled at step 34 and a near-field image is reconstructed at step 38. According to an embodiment of the invention, the near-field image is reconstructed at step 38 via back-projection of the far-field imaging datasets. According to another embodiment of the invention, a single iteration ordered subset expectation maximization (OSEM) step is used at step 38. The near-field image is post-processed using the ordered subset expectation maximization algorithm at step 40.

In the following FIGS. 3 and 4, and still referring to FIG. 1, source 16 will be taken to be 1 mCi of $^{137}$Cs, located at a perpendicular distance 18 of 100 meters from the baseline 14. Mask 20 of imaging device 12 is taken to have an approximately 50% filled coding, and gamma source 16 is taken to result in 50 counts/sec from the gamma source 16 at closest approach. In one embodiment, mask 20 includes a defined pattern of apertures therein such that each far-field image acquired is a shadow of the mask 20 formed at positions on the imaging device 12. As will be described, however, mask and anti-mask imaging data are acquired and processed according to embodiments of the invention, thus FIGS. 3 and 4 generically illustrate aggregation of far-field imaging data according to embodiments of the invention.

Figure 3:
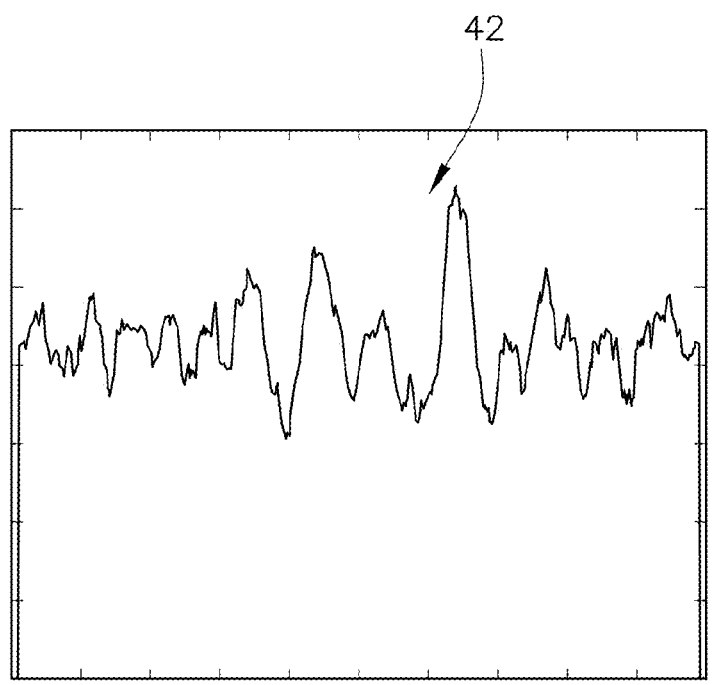
FIG. 3 illustrates an aggregated response function of a coded aperture.
Figure 4:
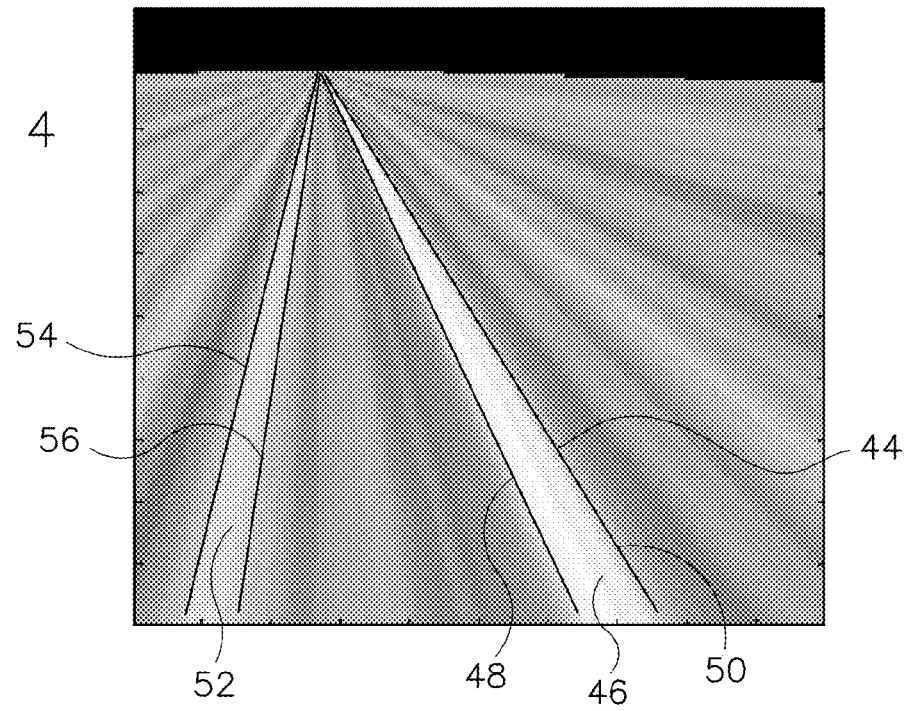
FIG. 4 illustrates an aggregated back-projection using far-field data of FIG. 3.

In the data illustrated in FIGS. 3 and 4, the length of the baseline 14 is assumed to be 200 meters, and the duration of the measurement to be 20 seconds. Thus, the speed of imaging device 12 is 10 meters/sec. Under this scenario, far-field images, with their corresponding back-projections, are obtained and processed via aggregated mode.

A far-field response of a coded aperture to a single measured photon is the "shadow" of the mask at each stimulated detector position as a function of azimuthal angle. The far-field response represents the probability of observing a photon at the detector element being described, given as a function of azimuthal angle. Because the elements of mask may not block all high-energy photons, but may allow some portion to pass through them, the response need not be zero at any angle. One skilled in the art will recognize that this 1-D response function can be extended to a 2-D function when elevation angle is included. In such an embodiment, the detector includes a 2-D array of elements configured to be stimulated from the gamma source 16 in one dimension as a function of azimuthal angle and in the second dimension as a function of elevation angle. Far-field data formed from single-photon events may be individually back-projected, and this operation can be performed in count-by-count list mode with the mobile platform 22 location at each detected count determining a virtual detector location for the single-count back-projection. In a pure list-mode back-projection, each single-count response is an angle-only function projected through space to form a spatial image of the angular response of the detector at that location.

However, in order to obtain data in a mask/anti-mask configuration, multiple consecutive counts are aggregated to form a single spatial response function that can be back-projected. This approach reduces computational burden by reducing the number of individual back-projection operations. The single-count responses are not angle-corrected during the aggregation operation, resulting in a longer baseline aperture for back-projection, and one which has a near-to-far field transition farther from the baseline location. This defines a trade-off between the length of baseline segment used in back-projection and the region of validity of the far-field results. Smaller segments will require more computation, but will result in more well-focused back-projections at shorter ranges from the imaging platform.

FIG. 3 illustrates an aggregated response function 42 and its associated back-projection 44 is illustrated in FIG. 4, according to an embodiment of the invention. This aggregated response function 42 is composed of the sum of responses for a number of source photons and no background photons. As illustrated in FIG. 4, the source photons likely originate from a source on a beam 46 formed by the back-projection and falling between line 48 and line 50. However, note that other less-shaded regions, such as beam 52 falling between line 54 and line 56, are given significant likelihood of containing a source as well. This is because none of the individual responses provides very specific information about the actual location of the source. All of them include the correct direction and it is the coincidence of responses that directs energy to the right location. Spatial localization of the source comes from the addition of many such images, each formed at a different position along the baseline.

The basic back-projection image formation for a planar (range & azimuth) imaging system using a 1-D detector array behind a 1-D array of absorbing elements can be summarized by writing the response function as $r(\theta,d)$, which represents the angular response of detector pixel "d" as a function of angle away from broadside. This same function also represents the normalized expected value of the "shadow" cast by a high intensity source at angle $\theta$, as a function of detector pixel, "d."

The back-projection image resulting from the aggregation operation can be written as:

$$I_a(x, y) = \sum_{s=1}^{S} \sum_{i=1}^{C_s} r\left(\arctan\left(\frac{x - x_s}{y - y_s}\right) - \theta_s, d_i\right); \quad \text{(Eqn. 1)}$$

where S is the number of baseline segments defined for the aggregation scheme, $C_s$ is the number of counts in the segment "s," $(x_s, y_s)$ is the nominal location of the segment, defined by:

$$x_s = \frac{x_{\sum_{n=1}^{s-1} C_n} + x_{\sum_{n=1}^{s} C_n}}{2} \text{ and } y_s = \frac{y_{\sum_{n=1}^{s-1} C_n} + y_{\sum_{n=1}^{s} C_n}}{2}; \quad \text{(Eqn. 2)}$$

where $\theta_s$ is the orientation angle of segment "s." In an alternate embodiment, if the segment is curved, a tangent to the curve can be used to define a straight segment, resulting in a piecewise linear path.

Figure 6:
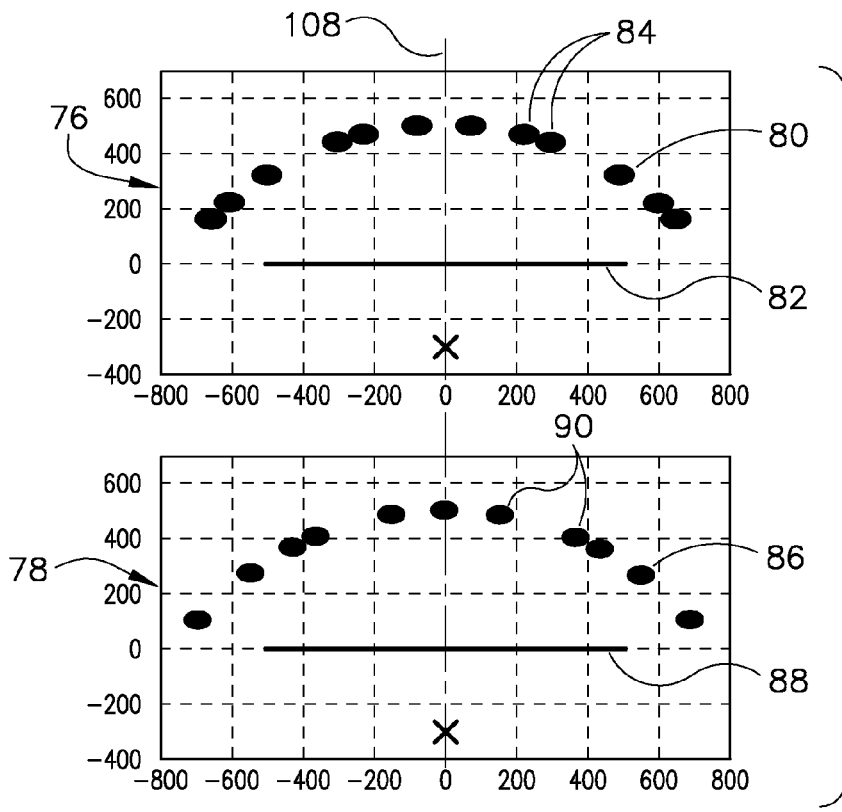
FIGS. 6 and 7 depicts mask/anti-mask pairs according to embodiments of the invention.

An iterative reconstruction algorithm of Emission Tomography is the Shepp-Vardi algorithm, which may be referred to as an Expectation Maximization (EM) algorithm. The Shepp-Vardi approach is an iterative image processing algorithm for contrast enhancement that makes use of the special structure of images constructed as a sum of back-projection terms. The algorithm starts with a pre-existing version of the image and performs a multiplicative operation to enhance its contrast. The Shepp-Vardi algorithm's iteration can be written in simplified fashion as:

$$I_{new} = I_{old} \times \frac{1}{\alpha} \sum_{s=1}^{N} \frac{m(s)}{p(s)} \text{response}(s, \theta, r); \quad \text{(Eqn. 3)}$$

where the response is equivalent to the back-projected, multiple-photon far-field image formed for a particular sub-aperture as illustrated, for example, in FIG. 6. The value m(s) is a measurement associated with that response that is, in general, a number of counts. The response is the sum of multiple individual photon back-projections, and so the measurement can be taken to have a value of one count. From the point of view of the image reconstruction algorithm, this may be interpreted as a single photon measurement with a complicated measurement response function. The value α is an image representing the result of back-projection when m(s)=p(s) for all s, and point-by-point division by this term makes the correct reconstruction a fixed point of the iteration, since in that case the multiplication will be by an image composed of all ones.

The p(s) term makes it data-adaptive. It may be referred to as a "pseudo-measurement" and it is computed by projecting the current image onto the measurement response as though the current image were a source distribution:

$$p(s) = \iint\limits_{field\ of\ view} I_{old}(\theta, r) d\theta dr; \quad \text{(Eqn. 4)}$$

This operation will actually be discrete, but is written as though it were a physical action over an actual source, as emulation of Eqn. 4 is the goal of the computation. If the current image exactly matches the real source distribution, then the scalar coefficients of the linear combination in Eqn. 3 are all unity and the image does not change. The data-adaptive coefficients in Eqn. 3 are based on an assumption that values that tend to emphasize responses that have not had a sufficiently great effect on the present image. In this way it attempts to explain all of the data in the reconstruction.

Thus, according to embodiments of the invention, the convergence rate may be increased by a modification to the iteration to include ordered subsets of data, referred to as "ordered subsets expectation maximization," or OSEM. Thus, the image contrast is enhanced as shown in Eqn. 5:

$$I_{new} = I_{old} \times \prod_{s=1}^{S} \frac{1}{\alpha} \sum_{n \in \Omega(s)} \frac{m(n)}{p(n)} \text{response}(n, \theta, r); \quad \text{(Eqn. 5)}$$

where the iterated product is over a set of S distinct subsets of the responses, {Ω(s), for s=1, . . . , S}. In a preferred embodiment, and referring back to FIG. 1, each subset is a group of sub-apertures 24 that covers the entire synthetic aperture of baseline 14, because such a set has essentially the same range resolution as the entire baseline. In an example, a set of fifty, 4-meter sub-apertures is divided into S=5 groups of 10 sub-apertures, where Ω(1)={1, 6, 11, 16, . . . , 46}, Ω(2)={2, 7, 12, 17, . . . , 47}, and so on. The iterated product in Eqn. 5 is referred to as an iteration, and it uses all of the data once. The inner sum may be referred to as a sub-iteration, and it sums up the back-projection terms in a single subset, Ω(s). And, although a set of fifty, 4-meter sub-apertures divided into S=5 groups of 10 sub-apertures is illustrated as an exemplary embodiment, it is understood that the scope of this invention includes any combination of groups and sub-apertures, as well as any sub-aperture size. Further, though the baseline is described as a 200 meter linear baseline, the baseline need be neither 200 meters nor linear.

When only one iteration is used, the number of summations of individual back-projection terms represented by Eqn. 3 is the same as that represented by the back-projection operation of Eqn. 1. In this sense, single-iteration Shepp-Vardi can be seen as an alternative to back-projection, and such is illustrated at step 68 and along path 58 of FIG. 2. Single-iteration OSEM, while not producing the same computational result as backprojection, still uses all the same information and the same number of backprojection operations to produce an image, and so it can also be seen as an alternative to back-projection. In one embodiment the Shepp-Vardi algorithm is modified by setting α to unity in Eqn. 3, and when the normalization image p(s) is also unity, then the iteration is equivalent to squaring the term $I_{old}$.

As discussed, an aggregated 1-D far-field image dataset formed by a coded aperture imager is illustrated in FIG. 3. Aggregated response function 42 is a function of angle only, and applies to point sources that are far enough away from the imager so that a moderate increase or reduction in range does not produce an appreciable difference in the observation recorded on the detector array. A standard description of such systems involves an imager geometry that allows the whole mask shadow to be recorded on the detector array. Responses to multiple point sources in the far field are multiple and substantially identical shadows of the whole mask, recorded at locations on the detector array that are determined by the angles of the sources with respect to the imager. The source distribution is imaged in such a case by correlation processing in which a response pattern representing the shadow of the mask is correlated with the measurement, and points of highest correlation indicate the source angles. This operation is one of correlation with a shift-invariant pattern.

In the case of a single source, the mean value of the far-field source distribution may be modeled from the point of view of an imager at a fixed location as:

$$s(\theta) = \overline{a}\delta(\theta_s) + b; \quad \text{(Eqn. 6)}$$

where $\delta(\theta_s)$ is a vector in the discrete angle domain, which is all zeros except for a one at the source angle, $\theta = \theta_s$, $\overline{a}$ is the expected value of the random amplitude of the source, and b is a mean vector of background radiation, which has positive components. Amplitude quantities are expressed as a number of photons incident on the aperture and assume data collection using a finite time aperture and limited energy range.

For far-field coded aperture imaging, the expected value of the detector plane observation (the recorded photons) is the "shadow" or response of the mask. For a spatially discrete, one-dimensional detector, this can be written as:

$$m(d) = \sum_{\theta=1}^{S} r(\theta, d) s(\theta); \quad \text{(Eqn. 7)}$$

where s(θ) is given by Eqn. 6, θ is the index of the discrete angle domain, r(θ,d) is the same response function as used in a list-mode function, and m(d) is a mean measurement (expected number of photons) in the $d^{th}$ detector element. An actual instance of the detector plane observation can be modeled by the mean expression of Eqn. 7 plus a vector of random noise, n, due to a short observation time (low counts). Because negative counts are not possible, the noise vector is constrained in such a way as to ensure that m(d) is non-negative for all d. With this model of the source, the mean detector measurement can be written as a vector-matrix product:

$$m = R^T[a\delta(\theta_s) + b]; \quad \text{(Eqn. 8)}$$

for an S-by-D matrix R whose $\theta^{th}$ row is r($\theta$,d), where S is the number of angles in the discrete angle domain, D is the number of detectors, and the angular sampling rate of the far-field image is chosen so that S>D. Because both the measurement and the source are non-negative, R is non-negative definite. For a simple shift-invariant response coded-aperture system, the matrix R in that case is banded, with a single band around the main diagonal, and is Toeplitz (or block Toeplitz), and such a matrix is invertible and well-conditioned. Matrix R is typically full-rank and quite well-conditioned.

The reconstruction approach is an application of a matched filter principle, so that the mean far-field image is obtained by multiplying the mean measurement by the response matrix:

$$\hat{s} = Rm = RR^T[a\delta(\theta_s) + b] = RR^Ta\delta(\theta_s) + RR^Tb; \quad \text{(Eqn. 9)}$$

in which the S-by-S self-product matrix $RR^T$ implements a correlation of the rows of R with all other rows. Because the objective of the operation is to form an image of $\delta(\theta_s)$, the long-observation-time fidelity of the image is determined by $RR^T$, referred to as a point spread matrix. There are at most D positive-valued singular values of this matrix, which limits its resolution to D degrees of freedom.

The mean source-to-background ratio may be obtained from Eqn. 6 and Eqn. 9. If the background is assumed uniform, so that E{b}=$\bar{b}$1, then the expected value of the image at $\theta_s$ is approximately:

$$\hat{s}(\theta_s) = RR^T\delta(\theta_s)(\bar{a} + \bar{b}) = (\bar{a} + \bar{b})\sum_{d=1}^{D} r^2(\theta_s, d); \quad \text{(Eqn. 10)}$$

where the sum represents the self-correlation of the response for angle $\theta_s$. Eqn. 10 is an approximation because it neglects non-zero cross-correlations with responses of angles near $\theta_s$ (that is, it neglects the width of the imaging mainlobe). For other angles, not within the mainlobe of the response to a source, the expected value of the image is approximately:

$$\hat{s}(\theta) = RR^T\delta(\theta)\bar{b} = \bar{b}\sum_{d=1}^{D} r^2(\theta, d). \quad \text{(Eqn. 11)}$$

If the responses for different directions all have roughly the same self-correlation, then the contrast ratio will be approximately $(\bar{a}+\bar{b})/\bar{b}$, and the difference in mean values between source and background image points will be $$\bar{a}\sum_{d=1}^{D} r^2(\theta, d).$$

The difference in source and background levels is important to the detectability of the source when combined with some measure of the variability of the image components. Because, for the embodiments illustrated herein, the number of source counts is typically far less than the number of background counts, the variability of the source feature amplitude is much greater than that of the background. Thus, the mean value of the background is larger than both that of the source and than the variability of the source.

Figure 5:
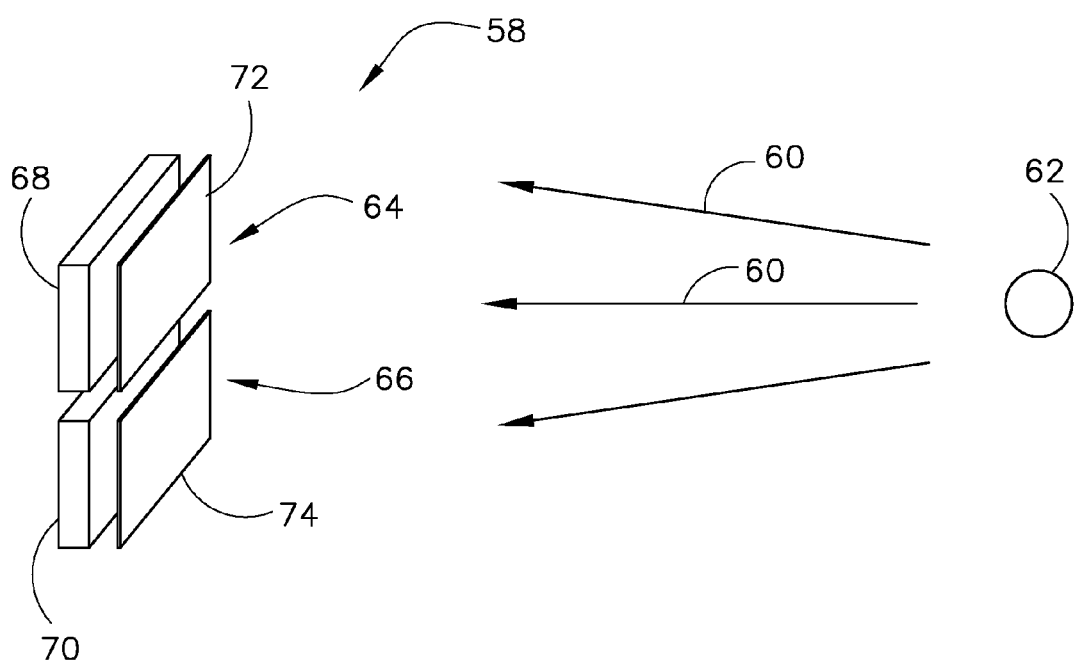
FIG. 5 illustrates an imaging device positioned to receive emissions from a gamma source according to an embodiment of the invention.

In order to obtain an enhanced reconstructed image, acquired data may be pre-processed to improve the contrast prior to back-projection. Thus, according to embodiments of the invention, mask/anti-mask processing may improve the initial far-field image. This scheme calls for two sets of data to be collected from the source distribution, one with a mask and then a second one, an anti-mask, having the complement of that mask. That is, the mask includes absorbing elements where the anti-mask has gaps, and vice versa. Such configurations allow simultaneous mask and anti-mask acquisition by deploying the mask/anti-mask in front of an imaging device 12 as depicted in, for instance, FIG. 1. FIG. 5 illustrates a perspective view of a two-tier mask according to embodiments of the invention.

Thus, as in FIG. 1 and referring now to FIG. 5, an imaging device 58 is positioned to receive emissions 60 emitting from a gamma source 62. In the illustrated embodiment, imaging device 58 includes a top tier 64 and a bottom tier 66. Top tier 64 includes a top detector 68 and a bottom detector 70. A mask 72 is positioned between the source 62 and the top detector 68, and an anti-mask 74 is positioned between the source 62 and the bottom detector 70. In embodiments of the invention, and as will be illustrated in FIGS. 6 and 7, mask 72 and anti-mask 74 include patterns of apertures that derive from one another. In one embodiment, the mask includes a first pattern of apertures that are separated by absorbing elements, and the pattern of apertures and absorbing elements of the anti-mask are a complement of the mask pattern. Further, although top tier 64 is illustrated having mask 72 and bottom tier 66 is illustrated having anti-mask 74, one skilled in the art will recognize that mask, anti-mask pair 72, 74 may be switched such that mask 72 is positioned in bottom tier 66 and anti-mask 74 is positioned in top tier 64. Likewise, top and bottom tiers 64, 66 may instead be positioned side-by-side, so long as they are positioned to receive emissions 60 from one or more sources 62.

Figure 7:
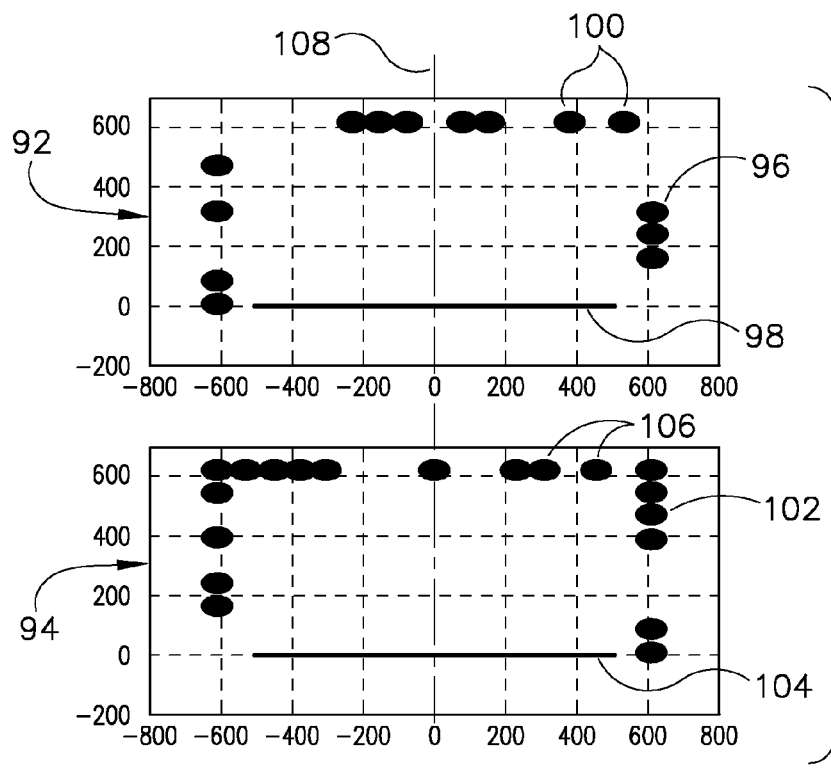

FIGS. 6 and 7 illustrate mask/anti-mask pairs according to embodiments of the invention. FIG. 6 illustrates a shallow arc mask with complementary tiers 76, 78 according to one embodiment of the invention. Tier 76 depicts a mask 80 positioned proximately to a detector 82, such as top detector 68 of FIG. 5. Mask 80 includes a plurality of absorbing elements 84. Likewise, tier 78 depicts anti-mask 86 positioned proximately to a detector 88, such as bottom detector 70 of FIG. 5. Anti-mask 86 includes a plurality of absorbing elements 90.

FIG. 7 illustrates mask/anti-mask pairs according to another embodiment of the invention. FIG. 7 illustrates a uniformly redundant array (URA) with complementary tiers 92, 94. Tier 92 depicts a U-shaped mask 96 positioned proximately to a detector 98, such as top detector 68 of FIG. 5. Mask 92 includes a plurality of absorbing elements 100. Likewise, tier 94 depicts its complement anti-mask 102 positioned proximately to a detector 104, such as bottom detector 70 of FIG. 5. Mask 94 includes a plurality of absorbing elements 106.

As illustrated, mask/anti-mask pair 80, 86 of FIG. 6 feature symmetry about a center line 108. That is, in the embodiment illustrated in FIG. 6, the absorbing elements 84 in top tier 76 mirror one another across center line 108, and the absorbing elements 90 in bottom tier 78 mirror one another across center line 108. In addition, the absorbing elements 84 in top tier 76 are located in positions corresponding to spaces between the absorbing elements 90 of the bottom tier 78 that are approximate complements of one another, and vice versa. The response matrices of the two masks may be referred to as $R_{top}$ and $R_{bottom}$. In FIG. 7, however, absorbing elements 100, 106 do not respectively mirror one another across center line 108. Absorbing elements 100, though, are located in positions corresponding to spaces between the absorbing elements 106.

Thus, according to embodiments of the invention, the mask/anti-mask pairs may be symmetrical or not, and may be approximate complements of one another. That is, when the mask/anti-mask pairs are approximate complements of one another, absorbing elements of one are positioned, with respect to a centerline, at approximate spaces, or gaps, of the other. However, as illustrated, the mask/anti-mask pairs may instead be derived from one another, such that masking elements of one of the mask/anti-mask pairs may be positioned as determined by their respective counterpart.

In practice, contrast of the final image is increased in mask/anti-mask processing by making the mean value of a uniform background equal to zero. The basic concept in dual mask processing is that the difference of the detector plane observations associated with the two masks, assuming that the fill factor of the two masks is roughly the same, make the mean value of the background part of the measurement equal to zero. The data subtraction operation is given by:

$$(m_{top} - m_{bottom}) = (R_{top}^T \bar{a}_{top} - R_{bottom}^T \bar{a}_{bottom}) \delta(\theta_s) + R_{top}^T b_{top} - R_{bottom}^T b_{bottom}. \qquad \text{(Eqn. 12)}$$

If the top and bottom detector arrays are assumed to have the same sensitivity, so that $\bar{a}_{top} = \bar{a}_{bottom} = \bar{a}$, then:

$$m_{top} - m_{bottom} = (R_{top}^T - R_{bottom}^T) \bar{a} \delta(\theta_s) \bar{b} [R_{top}^T 1 - R_{bottom}^T 1]; \qquad \text{(Eqn. 13)}$$

where we have used the earlier assumption that $E\{b\} = \bar{b}1$. The mean background level is reduced in Eqn. 13 because $R_{top}^T 1 \cong R_{bottom}^T 1$; that is, the mean response to a uniform background is a uniform count rate on the detector plane for both parts of the mask.

In order to form a far-field image of the difference in Eqn. 12, the matched filter principle is applied to the mean value of the difference in Eqn. 13. A filter matched to the expected value of the source response is obtained:

$$\hat{s} = (R_{top} - R_{bottom})(m_{top} - m_{bottom}) \qquad \text{(Eqn. 14)}$$

$$= \bar{a} R_{diff} R_{diff}^T \delta(\theta_s) + R_{diff} [R_{top}^T n_{top} - R_{bottom}^T n_{bottom}];$$

where $R_{diff}$ is defined $R_{diff} = (R_{top} - R_{bottom})$. Note that $\hat{s}(\theta)$ can be negative due to the subtraction operation. The mean value of the point spread matrix in this case is $R_{diff} R_{diff}^T$.

Mean point spread matrices of the two mask configurations of FIGS. 6 and 7 may be obtained that reveal a lower overall sidelobe structure and a more uniform mainlobe amplitude for the mask/anti-mask pair of FIG. 6 as compared to the complementary URA U-mask for FIG. 7

The mean background may be removed by subtraction of two measurements of the same background made with two different masks (e.g. a mask/anti-mask pair) with the same fill factor and the property that $R_{top}^T 1 \cong R_{bottom}^T 1$. However, such does not make use of the complementary nature of the masks. To maximize the source response in the expected value of the correlation image, given by:

$$r(\theta) = \bar{a}(R_{top} - R_{bottom})(R_{top}^T - R_{bottom}^T)\delta(\theta_s); \qquad \text{(Eqn. 15)}$$

then the value of the $\theta_s^{th}$ component of the vector:

$$r(\theta) = \bar{a}(R_{top} - R_{bottom})(r_{top}(\theta_s, d) - r_{bottom}(\theta_s, d)) \qquad \text{(Eqn. 16)}$$

$$= \bar{a} \sum_{d=1}^{D} (r_{top}(\theta, d) - r_{bottom}(\theta, d))(r_{top}(\theta_s, d) - r_{bottom}(\theta_s, d));$$

may be maximized where $r(\theta, d)$ is the response function defined in connection with a list mode operation. The component at $\theta_s$ represents the peak mainlobe response to a source at $\theta_s$, and it can be written as $$r(\theta_s) = \qquad \text{(Eqn. 17)}$$

$$\bar{a} \sum_{d=1}^{D} [r_{top}^2(\theta_s, d) + r_{bottom}^2(\theta_s, d) - 2r_{top}(\theta_s, d)r_{bottom}(\theta_s, d)].$$

For a fixed fill factor that is the same for top and bottom tiers, the squared terms will be approximately equal and not subject to much modification of their values. Therefore, the value of $r(\theta_s)$ is maximized when the value of $$2\sum_{d=1}^{D} (r_{top}(\theta_s, d) r_{bottom}(\theta_s, d))$$

is minimum. Because the mask response function lies between zero and one, this sum will be zero if $r_{top}(\theta_s, d)$ is zero for those values of "d" where $r_{bottom}(\theta_s, d)$ is nonzero, and vice versa. This condition describes a complementary mask for opaque mask elements.

Figure 8:
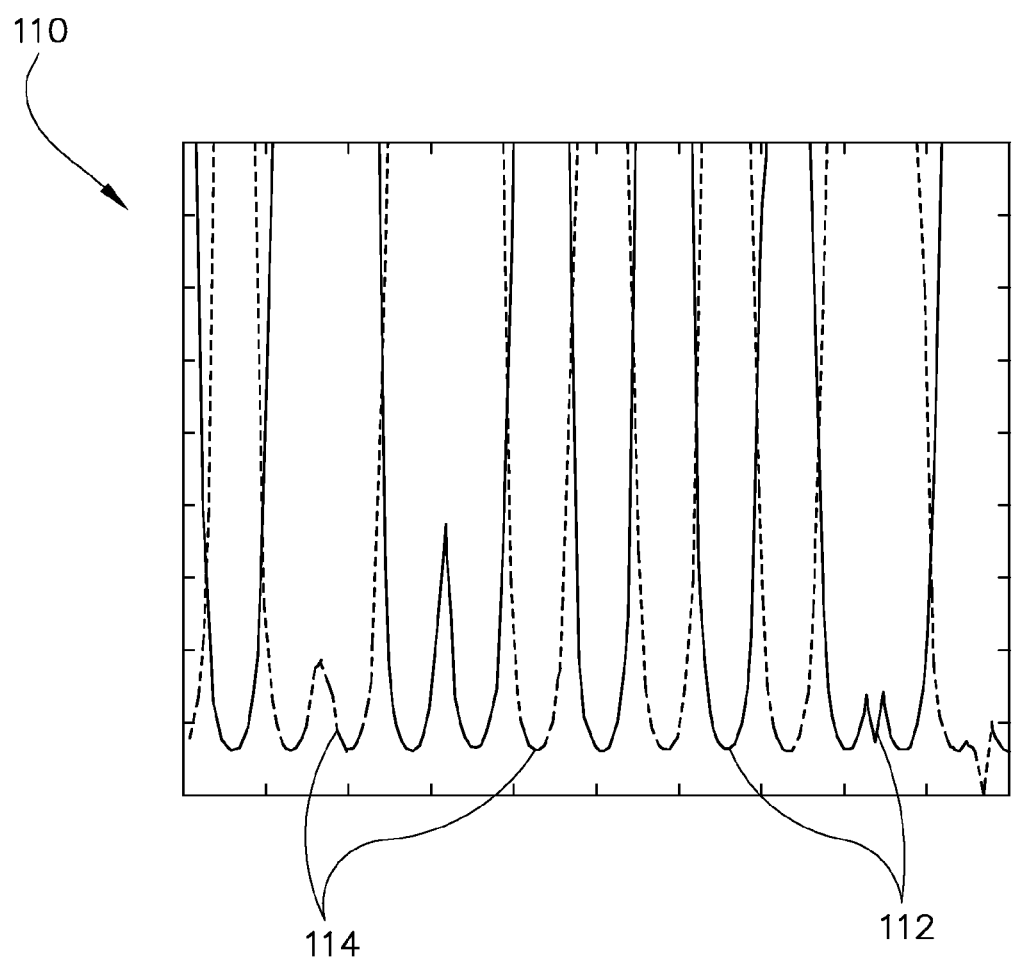
FIG. 8 illustrates an exemplary response on a detector plane for a top and bottom tier of a detector having mask/anti-mask components.

However, absorbing elements may be only partially opaque at the expected photon energies, and so the value of $$2\sum_{d=1}^{D} (r_{top}(\theta_s, d) r_{bottom}(\theta_s, d)),$$

in such an instance, may not equal to zero. Thus, FIG. 8 illustrates an exemplary mean response 110 on the detector plane for a fixed angle of $\theta_s = -9°$ away from broadside for top tier 112 and bottom tier 114. FIG. 8 plots responses that range from zero to unity over a number of locations in the position-sensitive detector array, although the only detector position for which the responses actually go to zero is near the edge, where a photon from the source angle of this example has to travel through two separate absorbing elements to reach the detector. In an example, a value of 0.5139 is computed for the quantity $$1/D \sum_{d=1}^{D} r_{top}^2(\theta_s, d)$$

and a value of 0.5137 for the quantity $$1/D \sum_{d=1}^{D} r_{bottom}^2(\theta_s, d).$$

The quantity $$1/D \sum_{d=1}^{D} (r_{top}(\theta_s, d) r_{bottom}(\theta_s, d))$$

was computed to be 0.2509.

Mask/anti-mask subtraction may be performed on far-field images prior to back-projection. However, an alternative is to form a sum far-field image of coded aperture results for the top and bottom tiers:

$$s = R_{top} m_{top} + R_{bottom} m_{bottom}.$$  (Eqn. 18)

and backproject the resulting far-field sum image.

The difference between the mean source response and mean background response for the scheme of Eqn. 18 is the sum of the equivalent differences for the two masks, as given by Eqn. 10, which is:

$$r(\theta_s) = \bar{a}_{top} \sum_{d=1}^{D} r_{top}^2(\theta_s, d) + \bar{a}_{bottom} \sum_{d=1}^{D} r_{bottom}^2(\theta_s, d).$$ (Eqn. 19)

It can be inferred from this that the mean source response of Eqn. 18 will exceed the mean background response by a larger margin than that of the mask/anti-mask approach for non-opaque mask elements, in view of the result given in Eqn. 17. Thus, a back-projection image formed with mask/anti-mask components, as computed by Eqn. 14, would provide lower source detectability than one formed using terms computed by Eqn. 18. However, mask/anti-mask processing enables a second pre-processing step that significantly enhances source detectability.

The resulting far-field images from Eqn. 14 have negative lobes which may be combined, adjusted, or offset in different fashions according to embodiments of the invention. According to one embodiment, the far-field images are simply back-projected "as is" and then scaled so that the minimum value of the resulting back-projected image is positive. Equivalently, a fixed constant could be added to all the terms prior to back-projection so that they are all positive. According to another embodiment of the invention, the negative values are set to zero. According to yet another embodiment, the most negative value may be subtracted from each far-field image prior to back-projection so that the minimum value of each far-field image is zero.

A technical contribution for the disclosed method and apparatus is that is provides for a computer implemented method of image reconstruction for a synthetic aperture gamma ray imager.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An imaging system, comprising:
a platform having mounted thereon an imaging device, the imaging device comprising:
a first detector; and
a second detector;
a mask having a first pattern of apertures therein, the mask positioned on a first side of the first detector;
an anti-mask having a second pattern of apertures therein, wherein the second pattern is derived from the first pattern, the anti-mask positioned on a first side of the second detector; and
a computer configured to:
acquire a plurality of mask datasets and anti-mask datasets of a gamma source;
add one of the mask datasets and subtract its respective anti-mask dataset to create a far-field dataset;
adjust the far-field image dataset;
reconstruct a near-field image of the source using the far-field dataset; and
apply an expectation maximization (EM) algorithm to one of the far-field image dataset and the near-field image to enhance contrast.

2. The imaging system of claim 1, wherein the computer is configured to subtract a negative of the respective anti-mask dataset to create the far-field dataset.

3. The imaging system of claim 1, wherein the computer is configured to adjust the far-field image dataset using one of a scaling factor, an offset, and a fixed constant.

4. The imaging system of claim 1, wherein the mask and anti-mask comprise a pair of shallow arc masks having complementary tiers of absorbing elements.

5. The imaging system of claim 1, wherein the computer is further configured to:
back-project the far-field dataset; and
apply the EM algorithm to the near-field image to enhance its contrast.

6. The imaging system of claim 1, wherein the computer is further configured to adjust the far-field dataset by linearly offsetting each term of the far-field dataset by a constant such that the minimum value of the far-field dataset is zero.

7. The imaging system of claim 1, wherein the computer is configured to simultaneously acquire respective mask and anti-mask datasets.

8. The imaging system of claim 1, wherein the second pattern is an approximate complement of the first pattern.

9. The imaging system of claim 1, wherein the first and second detectors are pixelated into 2-D arrays, each 2-D array configured to provide both elevation and cross-range positional information of the gamma source.

10. The imaging system of claim 1, wherein the EM algorithm is an ordered subset expectation maximization algorithm (OSEM) that includes ordered subsets of the mask and anti-mask datasets.

11. The imaging system of claim 1, wherein the computer is configured to obtain additional far-field datasets, and aggregate and back-project the far-field datasets as a single spatial response.

12. The imaging system of claim 1, wherein multiple far-field datasets are acquired with the platform positioned over N baseline segments along a path, wherein N is an integer $\geq 2$.

13. The imaging system of claim 1, wherein the platform is positioned on one of a truck, a sport utility vehicle (SUV), an airplane, and a helicopter.

14. The imaging system of claim 1, wherein the EM algorithm comprises a modified Shepp-Vardi algorithm.

15. A method of imaging a gamma source comprising:
positioning a mask/anti-mask combination between a source and a detector;
acquiring mask datasets from the source over a baseline and from gamma rays emitted from the source and passing through the mask;
acquiring anti-mask datasets from the source over a baseline and from gamma rays emitted from the source and passing through the anti-mask;
adding the mask datasets and subtracting respective anti-mask datasets to obtain respective far-field datasets;
offsetting at least a portion of the data within each far-field dataset;

forming a near-field image of a source of the photons using the offset data; and applying an iteration of an expectation maximization (EM) reconstruction algorithm to one of the far-field datasets and the near-field image.

16. The method of claim 15, wherein adding the mask datasets and subtracting respective anti-mask datasets comprises subtracting a negative respective anti-mask datasets to obtain respective far-field datasets.

17. The method of claim 15, wherein the mask/anti-mask combination are shallow arc masks.

18. The method of claim 15, comprising applying the EM reconstruction algorithm to the near-field image.

19. The method of claim 15, comprising acquiring the mask and anti-mask datasets simultaneously.

20. The method of claim 15, comprising ordering the far-field images as subsets of data.

21. The method of claim 20, comprising back-projecting the offset far-field datasets in an aggregated mode.

22. The method of claim 21, wherein the at least a portion of data within each far-field dataset is offset so that its minimum is greater than or equal to zero.

23. A computer readable storage medium having stored thereon a program configured to:

acquire a plurality of sets of mask and anti-mask datasets of a radiation source from an imaging device over a synthetic aperture, wherein the acquired sets of data comprise:

a mask dataset acquired from gamma rays passing through a mask; and an anti-mask dataset acquired from gamma rays passing through an anti-mask;

subtract the anti-mask dataset from the mask dataset to form a far-field image dataset;

offset the far-field image dataset;

reconstruct a near-field image of the source using the offset far-field image dataset; and enhance contrast of the reconstructed near-field image using an ordered subsets expectation maximization (OSEM) algorithm.

24. The computer readable storage medium of claim 23, wherein the program is configured to offset far-field image dataset by adding a constant to terms within the dataset such that a minimum term is approximately zero.

25. The computer readable storage medium of claim 23, wherein the OSEM algorithm comprises a modified Shepp-Vardi algorithm.

26. The computer readable storage medium of claim 23, wherein the synthetic aperture is defined by a plurality of positions from which the imaging device acquires the plurality of far-field images.

* * * * *